2,056,516

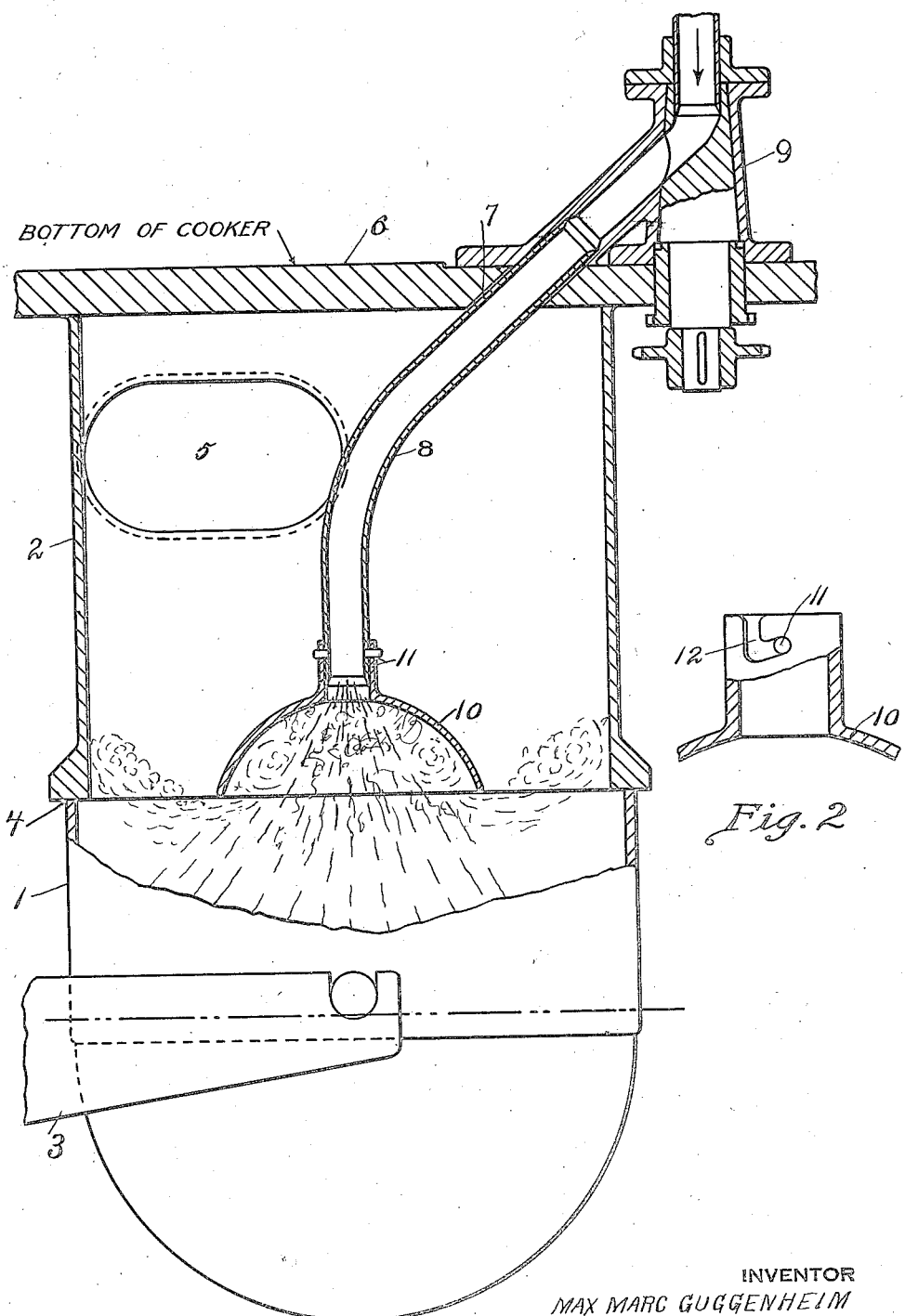
Oct. 6, 1936. M. M. GUGGENHEIM 2,056,516
SIRUP DISCHARGE NOZZLE FOR FILLING VACUUM COOKERS
Filed Dec. 29, 1934
INVENTOR
MAX MARC GUGGENHEIM
BY
George B. Willcox
ATTORNEY Patented Oct. 6, 1936

UNITED STATES PATENT OFFICE 2,056,516

SIRUP DISCHARGE NOZZLE FOR FILLING VACUUM COOKERS

Max Marc Guggenheim, Saginaw, Mich., assignor to Baker Perkins Company, Inc., Saginaw, Mich., a corporation of New York Application December 29, 1934, Serial No. 759,694

2 Claims. (Cl. 159—2)

This invention is an improvement in vessels of the kind commonly employed in factories for concentrating, in vacuum, liquids that are delivered to the vessel from the coil of a continuous cooker, or other source.

For purposes of description a device embodying the invention will be shown applied to a vacuum concentrator employed for removing gases and vapors from precooked hot sugar sirup, the bottom of the cooker being the top of the dome portion of the concentrating vessel. The top or ceiling of the vacuum vessel is kept hot by the heat of the superimposed cooker.

That hot ceiling has been a source of trouble, especially in confectionery making, because the liquid material was sprayed or atomized and spread all over the inner walls of the vacuum dome including the under face of its ceiling, producing an accumulation of gummy, sticky masses of partly hardened material which soon cooked onto the hot ceiling. Eventual dislodgment of these lumps into the liquid impaired the quality and smoothness of the product.

The cause of atomization and the resultant production of an uncontrolled cloud or mist of sticky material was inherent in the fact that a stream of hot cooked sirup was discharged through an ordinary flared nozzle downwardly into the vacuum space of the concentrator vessel and given a free fall therein. Vapors and gases that were entrained in the hot sirup gradually expanded before they left the nozzle, causing the liquid to flash into a cloud of mist at the discharge opening of the nozzle and also at some distance from the opening. Part of that mist rose clear to the ceiling of the dome and part was pumped out by the vacuum pump. That portion which touched the hot ceiling stuck, accumulated and hardened into an undesirable gummy mass which ultimately fell into the liquid and impaired its quality.

The object of this invention is to provide a simple effective and inexpensive means for overcoming those difficulties, and the problem has been solved by applying the principle of constraining the flash expansion to a nozzle which is dome-shaped so that the complete flash occurs suddenly and abruptly inside the nozzle. For that purpose the nozzle is shaped to present an inverted bowl located in the midst of the vacuum chamber above the liquid. This bowl is surprisingly effective in preventing sugar particles from rising to the top of the dome in sufficient quantity to build up into objectionable gummy masses or from getting into the vacuum pipe. It results in a smoother and more uniform and easier workable product.

Accordingly the invention comprises the elements and combinations of elements, features of construction and arrangements of parts which will be exemplified in the structure hereinafter described, the scope of the application of which will be indicated in the claims.

In the accompanying drawing, which illustrates a preferred embodiment of the invention applied to a sugar-sirup concentrator, Fig. 1 is a part sectional, part diagrammatic side view of a conventional vacuum vessel with the improved device of my invention applied thereto.

Fig. 2 is a part sectional detail view of the inverted bowl, showing a bayonet slot device for removably attaching the bowl to the feed pipe.

Referring now to Fig. 1, a conventional vacuum vessel in which the liquid is treated consists of the usual lower receiving kettle portion 1 and a cylindrical upper body 2, called the dome, to which the receiving kettle is removably applied by means of a handling bracket 3 so as to make an air-tight joint 4. The dome 2 is formed with an opening 5 communicating with any vacuum source, such as a pump (not shown). The top 6 of dome 2 has an opening 7 through which passes, as by an air-tight joint, a pipe 8 that extends downwardly from a valve 9 to a point above the liquid level in the receiving kettle when the latter is fully charged, say, to the level indicated by the broken line. The pipe 8 may be the end of a sirup cooker coil, not shown, and the top 6 of dome 2 may be the bottom of a cooker, that being the usual relative arrangement of a cooker and a vacuum concentrator in the confectionery making type of apparatus.

My invention is applied to such an apparatus as follows: A bowl shaped nozzle 10 is secured to the end of the supply pipe, its mouth being directed downwardly substantially coaxially with the vacuum vessel and located high enough above the liquid level to give free passage beneath its bottom marginal edge for vapors that result from the flash action of the material. The bowl is preferably secured to the end of pipe 8 by a pin 11 and a co-operative bayonet slot 12, as shown in Fig. 2. The pipe is preferably approximately flush with the apex of the bowl so as not to present a protruding end that would invite crystallization around its edge. The width of the bowl mouth may be in practice equal to about half the diameter of the dome 2, its height being approximately half its own diameter, those proportions having been found satisfactory for handling cooked sugar sirup. The end of pipe 8 is at the apex of the bowl and there the walls of the bowl flare out abruptly as shown. The kettle 1 and dome 2 may be jacketed for external application of heat if desired for hot processing of some kinds of material, or such jacket may be used for cooling materials that require it, although for purposes of illustration no jacket is shown in Fig. 1.

In operation, kettle 1 and dome 2 having been joined as in Fig. 1, the vacuum pump is started, valve 9 is opened and the liquid to be treated, say, hot cooked sugar sirup, is discharged from the source of supply downwardly through pipe 8. The material accumulates in the receiving kettle 1 until it has risen to about the level indicated by the broken line in Fig. 1. As the liquid emerges from the pipe 8 and commences its free fall downward through the inverted bowl shaped nozzle 10 its entrained gases suddenly expand and flash inside the nozzle under the action of the vacuum that is in the nozzle, developing a fine mist of sirup particles and vapor. It will be observed that the initial flashing and expansion are confined to the interior of the nozzle 10 and to the space beneath it, and that the expansive force is directed by the bowl downward toward the surface of the liquid so that all of the sugar particles are propelled downwardly into the zone or free space that exists between the bowl and the liquid level in the kettle. The bowl in itself, by reason of its size and shape, presents a free space for the unhampered flashing action above described.

The vacuum pump draws the liberated steam and gases upward and through opening 5.

Due to the above described action of the bowl shaped nozzle, no material accumulates on the top of the dome 2 or on the upper parts of the walls above the zone occupied by the bowl 10.

While I have described the undesirable accumulation as being formed by the gumming action of the hot member 6, in earlier devices, and have designated the material as sugar sirup, it is obvious that for concentrating other substances which, upon being deposited on the dome surfaces, will harden without being subjected to further heat, the plate 6 need not necessarily be a heated surface.

In principle the mode of operation of the bowl structure herein described is different from that of the earlier devices in which the liquid was discharged into the kettle through a nozzle of slightly flaring shape.

The earlier nozzles were generally cone shaped and they permitted a gradual expansion to occur within the nozzle, reducing the flash effect. The flash was completed at the very edge of the nozzle, permitting the fine particles of material to be projected all over the interior of the apparatus and resulting in the undesirable accumulation at the top, as has been described.

Another serious disadvantage of the cone-shaped nozzles was that the flashing effect within them caused sugar to be deposited on the inner face of the cone. This required cleaning at intervals of about three hours. The bowl-shaped nozzle of my invention requires cleaning only once or twice in a full day's run.

Other types of earlier nozzles have been made straight instead of cone shaped, but they were impracticable for the purpose of treating sugar sirups and similar crystal-producing substances, because the end of a straight nozzle, even though it be surrounded by a shield, caused graining at the edges of the aperture and ultimate plugging of the feed pipe. The present invention provides a bowl 10 which is convexed inwardly, flares abruptly at the apex of the bowl where the pipe ends, and so brings about complete flashing action within the bowl, and entire uniformity of quality of the product.

The under side of my improved bowl presents a smooth completely curved surface that presents no edges nor corners into which the material can accumulate and solidify. The bowl shape causes the expansion or explosion to drive or sweep the material along the smooth curved part of the bowl downwardly into the kettle without giving it an opportunity to adhere to and build up in the supply pipe 8, 11.

In addition to the foregoing advantages, it has been found in practice that my curved bowl construction results in a smoother, more homogeneous finished product. The texture is uniform throughout, whereas with other types of nozzles, especially those of the kind wherein the shape of the nozzle aids the accumulation of material on it, and consequently the shape changes with such accumulation, the results are not uniform. With such changes in shape of the nozzle, different nozzle action occurs and a different kind of explosive action takes place.

So far as can be judged, the self-clearing action of my nozzle and bowl is one of the factors that enables the device herein described to produce a perfectly uniform finished product, whereas all other types of nozzles with which I am familiar give a product that is inferior in respect to uniformity of texture.

Having thus described my invention, what I claim and desire to secure by Letters Patent is:

1. In a concentrating vessel for treating hot sticky sugar material, comprising a kettle having a material supply pipe and an outlet to vacuum; in combination, an inverted bowl-shaped element characterized by having abruptly flared outwardly and downwardly curved walls and having an opening at its apex, said supply pipe being connected to said opening and being substantially flush therewith; the marginal edge of said element being located below the outlet to vacuum and adjacent the liquid level in the kettle when the latter contains a normal charge of material; the volumetric capacity of said element being appropriate to embrace the normal flashing volume of material being delivered from the supply pipe, and the shape of the walls of said element being appropriate to impel the material which normally tends to deposit at the edge of the nozzle, outwardly and downwardly along said curved walls.

2. In a concentrating vessel for treating hot sticky sugar material, comprising a kettle having a material supply pipe and an outlet to vacuum; in combination, an inverted bowl-shaped element characterized by having abruptly flared outwardly and downwardly curved walls and having an opening at its apex, said supply pipe being connected to said opening and terminating substantially flush therewith; the shape of the curved walls of said element being adapted to direct that part of the material which normally tends to deposit at the edge of the nozzle away from said nozzle under the expansive action of material issuing therefrom.

MAX MARC GUGGENHEIM.